INVENTOR
JESSE RAY JOHNSON
ATTORNEYS

April 14, 1970 J. R. JOHNSON 3,506,239
VALVE WITH SECTIONAL BODY STRUCTURE AND SEALING MEANS THEREFOR
Filed April 24, 1968 3 Sheets-Sheet 2

INVENTOR
JESSE RAY JOHNSON
BY
Strauch, Nolan, Neale,
Nies & Kurz
ATTORNEYS

April 14, 1970     J. R. JOHNSON     3,506,239
VALVE WITH SECTIONAL BODY STRUCTURE AND SEALING MEANS THEREFOR
Filed April 24, 1968     3 Sheets-Sheet 3

INVENTOR
JESSE RAY JOHNSON

BY *Strauch, Nolan, Neale,*
*Nies & Kurz*
ATTORNEYS

United States Patent Office 3,506,239
Patented Apr. 14, 1970

3,506,239
VALVE WITH SECTIONAL BODY STRUCTURE AND SEALING MEANS THEREFOR
Jesse R. Johnson, Gowanda, N.Y., assignor, by mesne assignments, to AVM Corporation, Jamestown, N.Y., a corporation of New York
Filed Apr. 24, 1968, Ser. No. 723,864
Int. Cl. F16k *5/04, 5/18*
U.S. Cl. 251—310     15 Claims

ABSTRACT OF THE DISCLOSURE

A valve assembly comprises a hollow body having a bottom fluid inlet opening and at least one side outlet opening and contains a hollow plug rotatable between positions where it blocks or permits fluid passage between said openings. A saddle is provided at the outlet opening for mounting an outlet tube in predetermined location, and comprises an integral annular member having radially spaced inner and outer annular arms joined at their outer ends by a bridge, with the radially outer arm being secured to the body around the outlet opening and there being secured to the body around the outlet opening and there being an axially outwardly facing internal shoulder on the inner arm against which abuts the inner end of the outlet tube. A resilient seal annulus is mounted on a frusto-conical inner end section of the inner arm of the saddle and disposed to engage and resiliently conform to the plug surface.

SUMMARY AND BACKGROUND OF INVENTION

The invention relates to valves, principally plug valves, of the type disclosed in applicant's Patent No. 2,973,181 issued Feb. 28, 1961 and is concerned with improvements in the fabrication, assembly and operation of such valves.

More particularly the invention concerns itself mainly with the provision of means for independently mounting a fluid conducting tube and an associated fluid pressure seal in proper location during valve assembly, and in the preferred form of the invention this mounting comprises an annular saddle secured over a body opening and formed for mounting and locating the tube and seal respectively. The invention further concerns itself with a special hollow valve body structure wherein an inturned hollow boss in the bottom of the body extends up into telescoping relation with the open lower end of a hollow valve plug, and associated therewith a special inexpensively fabricated hollow plug construction.

These are all objects of the invention as will appear in connection with the details of disclosure and the drawings.

PREFERRED EMBODIMENT

Figure 2:
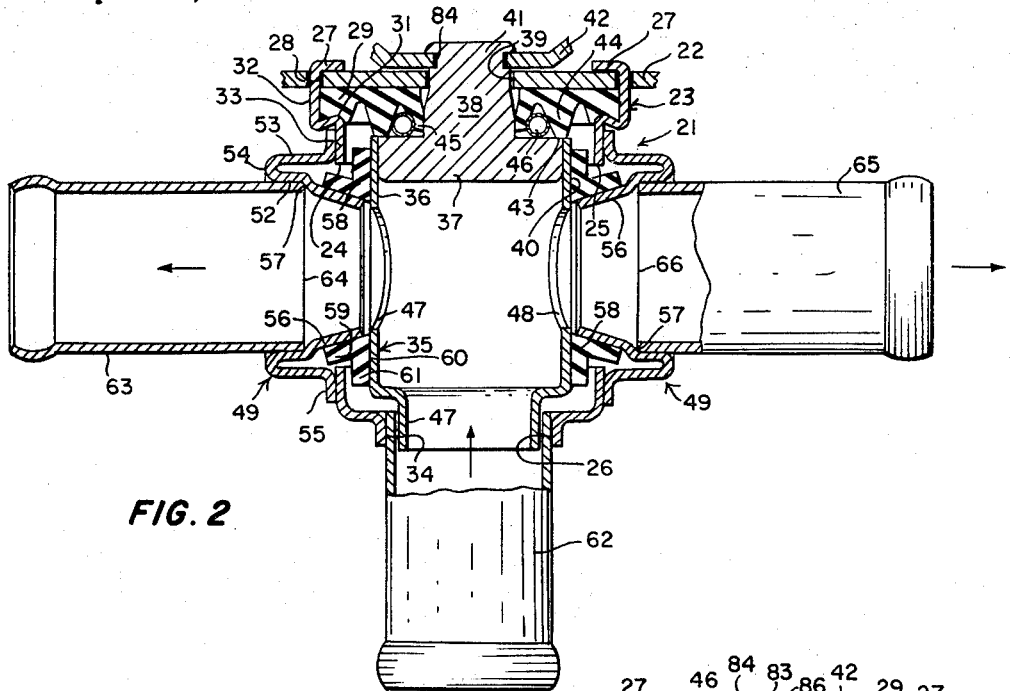
FIGURE 2 is a vertical section showing internal details of the valve assembly.

In the preferred embodiment of the invention the valve assembly 21 comprises a top plate 22 which serves as the cover for the open top of a hollow metal valve body 23 having diametrically opposed lateral fluid outlet openings 24 and 25 and a bottom fluid inlet opening 26. Body 23 is suspended from plate 22, which also serves to mount the assembly in a desired location, as by tabs 27 extending through plate apertures 28 and bent over onto the upper side of the plate.

A resilient annular stem seal 29 is compressed axially at its outer periphery between the underside of plate 22 and a body shoulder 31 formed between the enlarged diameter upper end 32 of the valve body and a smaller diameter cylindrical portion 33 in which outlet openings 24 and 25 are formed. This forms a fluid tight seal between the upper end of body 23 and plate 22. Inlet opening 26 is formed in a reduced diameter tubular extension 34 of the lower end of the body.

A valve plug 35 is rotatably mounted within body 23, and it comprises a hollow sheet metal shell 36 in the open upper end of which is tightly press fitted a brass closure 37 from which projects an integral valve stem 38 through an aperture 39 in plate 22 to terminate in a head 41 staked over to be secured rigidly to an operating lever 42. The upper end of closure 37 is flush with the upper edge of shell 36, and the upper flat end of the valve plug bears slidably against the flat annular surface 43 on the lower end of a resilient annular internal rib on stem seal 29. Stem seal 29 is formed with an inner resilient annular rib 45 that is urged to contract and sealingly surround valve stem 38 by a suitable spring ring 46 disposed between the ribs.

The outer surface 40 of shell 36 is preferably coated with a corrosion resistant plastic such as polytetrafluorethylene. At its lower end, shell 36 terminates in a reduced diameter hollow boss 47 extending in spaced relation through body opening 26.

The side wall of shell 36 is formed with diametrically opposite openings 47 and 48, which, when the valve is open as in FIGURE 2, are aligned with body openings 24 and 25. Alternatively the invention may be applied to valve structures wherein the body and shell have related openings so arranged that only one set of openings is aligned while the other set is closed in different positions of rotation of the valve plug.

Figure 4:
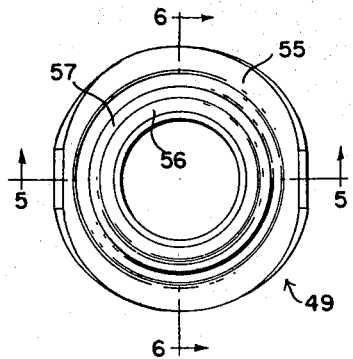
FIGURE 4 is an elevation showing the saddle member used in both embodiments of FIGURES 2 and 3 for mounting the outlet tubes.
Figure 7:
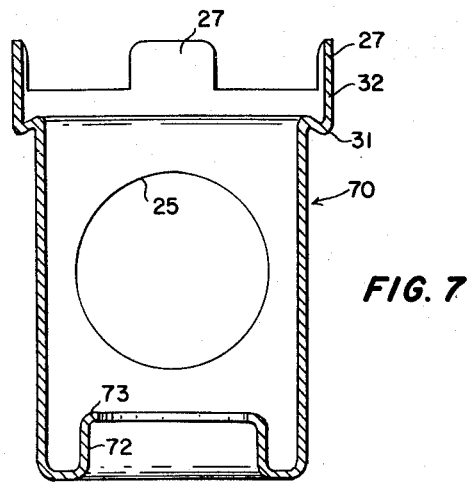
FIGURE 7 is a section through the valve body of FIGURE 3 apart from the rest of the assembly.
Figure 5:
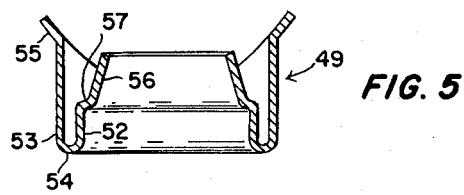
FIGURES 5 and 6 are sections substantially on lines 5—5 and 6—6 of FIGURE 4.
Figure 6:
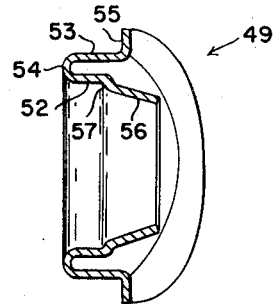
Figure 8:
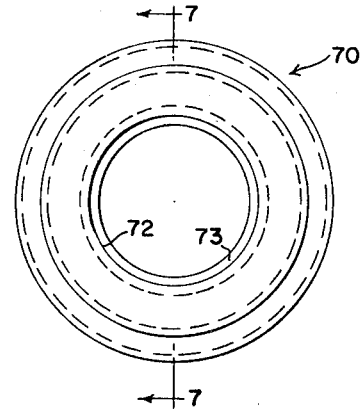
FIGURE 8 is a bottom plan view of the valve body of FIGURE 7.
Figure 15:
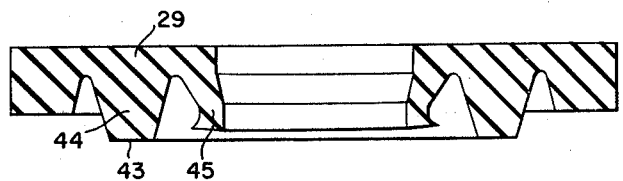
FIGURE 15 is a section showing detail of the sealing annulus around the valve stem between the top of the valve plug and the mounting plate.
Figure 9:
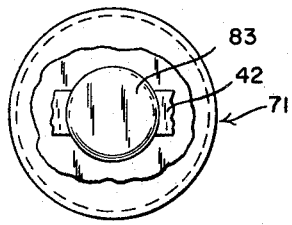
FIGURE 9 is a top plan view of the valve plug assembly of FIGURE 3.
Figure 10:
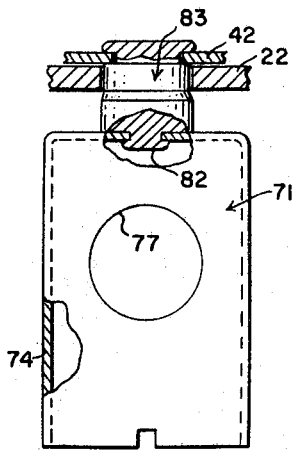
FIGURE 10 is a side elevation partly broken away and sectioned, showing further detail as to the valve plug of FIGURE 9.
Figure 11:
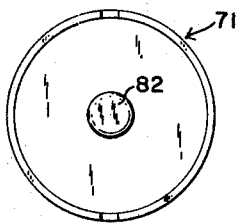
FIGURE 11 is a bottom plan view of the valve plug of FIGURES 9 and 10.
Figure 12:
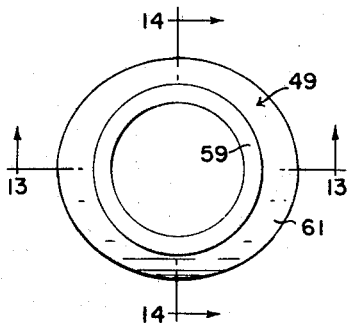
FIGURE 12 is an elevation showing the flexible outlet seal of both embodiments of FIGURES 2 and 3 in relaxed condition.
Figure 13:
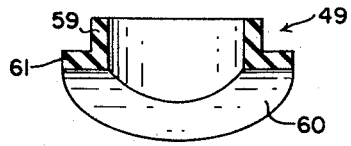
FIGURES 13 and 14 show sections on the seal substantially along lines 13—13 and 14—14 of FIGURE 12.
Figure 14:
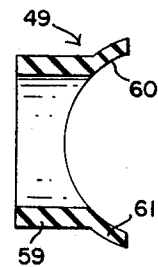

Outlet tube mounting saddles in the form of integral metal members 49 are mounted on body 23 in surrounding relation to openings 24 and 25 respectively. FIGURES 4–6 show a saddle 49 apart from the body. Saddle 49 is an integral annular element of generally U-shape in radial section preferably stamped from a single sheet of metal and comprises inner and outer parallel cylindrical portions 52 and 53 joined at their outer ends by bridge 54.

At its inner end, portion 53 is turned outwardly to form an annular flange 55 that conforms to the external contour of body 23 entirely around opening 24, and flange 55 is permanently secured to body 23 as by brazing or welding. This mounts saddle 49 rigidly on body 23.

Saddle portion 52 is formed at its inner end with a reduced diameter inwardly converging tapered and preferably frusto-conical section 56 that projects within body 23 and terminates adjacent but free of the plug surface. The junction at the larger end of tapered section 56 forms an annular internal shoulder 57 that faces axially outwardly in the assembly.

A resilient sealing ring 58 is mounted on tapered section 56 of the saddle 49. As shown, ring 58 is generally L-shaped in normal radial section with one resiliently stressed arm 59 snugly and resiliently surrounding the smooth tapered outer surface at 56. The other resiliently stressed arm 61 of ring 58 engages plug shell 36, and its inner surface 60 is shaped to conform snugly with the contour of shell 36. Arm 59 may be bonded to tapered section 56 so as to be fixed axially of sleeve 49. Arm 61 engages shell 36 with sufficient force to provide a fluid tight seal around the opening 47 when the valve is open, especially when backed with inlet fluid pressure as will appear, but it does not impede rotation of the plug.

At the lower end of valve body 23, a fluid inlet tube 62 is inserted with a press fit within extension 34 and suitably permanently secured therein as by welding or brazing.

One fluid outlet tube 63 extends snugly, usually with a press fit, within the cylindrical wall defined by portion 52 of saddle 49 until its end 64 abuts shoulder 57, and tube 63 is suitably permanently secured to the saddle as by brazing or welding.

A similar saddle 49 is secured upon body 23 in surrounding relation to opening 25, and is formed with a conical inner section 56 on which a resilient seal ring 58 is mounted in coacting relation with the shell 36. The other fluid outlet tube 65 has a press fit within and is surrounded by the cylindrical inner portion 52 of the saddle and its inner end 66 abuts saddle shoulder 57. The saddle and outlet tube structure at opposite sides of the body are thus preferably identical.

The foregoing structure enables the use of simple uniform diameter cylindrical tubes for the inlet and outlet, thus reducing inventory. In fact no special tubes need be stocked, and the required lengths can be cut from long tubes in stock. This structure also avoids the expense of forming conical seal mounting sections on the inner ends of the outlet tubes, as was necessary in the prior valve assembly of this type disclosed in Johnson Patent No. 2,973,181. By thrusting the inlet and outlet tubes into cylindrical sockets until they bottom on the internal shoulders, complete assembly of the tubes with the body is assured. The structure of the invention is moreover less expensive to assemble since the longitudinal positions of the outlet tubes is determined by thrusting them into the cylindrical sockets formed by saddle portions 52 until they abut the shoulders 57, the conical seats 56 for the seal rings already having been accurately located in the assembly by securing the saddle flanges 55 to the valve body.

The brazed or welded connections between the sheet metal body 23, saddles 49 and tubes 62, 63 and 65 provides a sturdy permanently assembled fluid tight body structure within which the valve plug 35 may be turned between the fully open position shown in FIGURE 2 and a fully closed position at 90° with respect to that position. Fluid at inlet pressure that enters the sealed body structure will externally surround resilient seal rings 58 to spread the arms 59 and 61 and increase the resilient seal between the valve plug 35 and the outlet.

Figure 3:
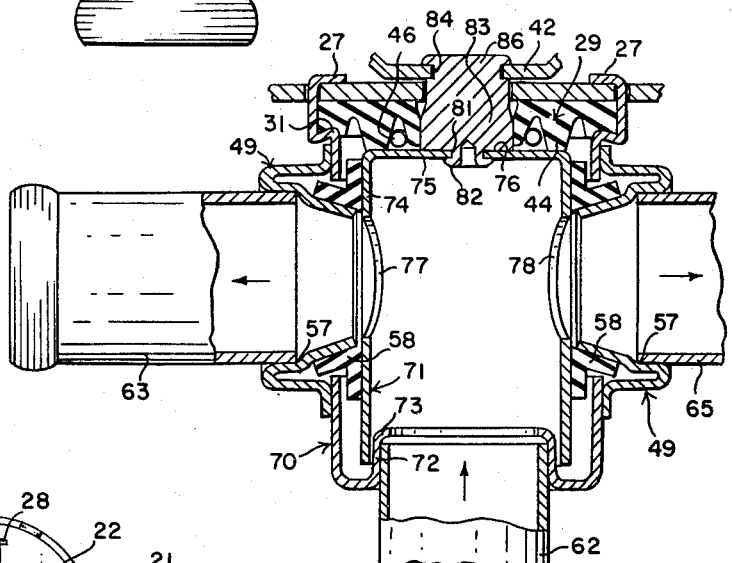
FIGURE 3 is a section like FIGURE 2 and showing internal details of a different embodiment of the valve assembly.
Figure 1:
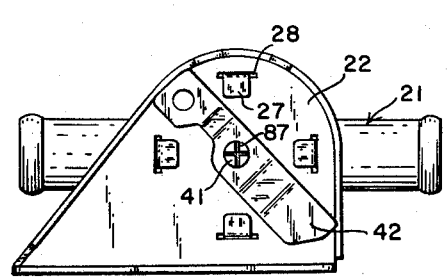
FIGURE 1 is a top plan view of a valve assembly incorporating a preferred embodiment of the invention.

FIGURE 3 illustrates a further embodiment of the invention wherein the valve body 70 and the valve plug 71 are of different construction from FIGURE 1. In this embodiment cylindrical body 70 is the same as body 23 at its upper end and is similarly attached to plate 22, with similar reference numerals identifying similar parts.

The lower end of body 70 is turned inwardly and then upwardly to form in internal hollow cylindrical boss 72 that terminates in an inturned ledge 73 against which abuts the inner end of inlet tube 62.

Saddles 49 are mounted around the opposite body openings, and they carry resilient seal rings 58 as in FIGURE 2.

Valve plug 71 comprises a sheet metal cylindrical shell 74 coated with Teflon or the like and having a closed top wall 75 against the upper flat surfaces 76 of which resiliently bears rib 44 of stem seal 29. Shell 74 is formed with diametrically opposed outlet openings 77 and 78 adapted to be aligned with the outlet tubes as in FIGURE 2, and its open lower end extends to rotatably surround body boss 72.

Figure 16:
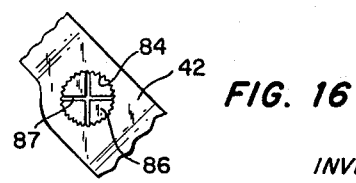
FIGURE 16 is a top plan fragmentary view showing attachment of the plug stem to the lever.

The top wall of plug 71 is apertured at 81 to receive a button 82 on the lower end of a brass stem 83, button 82 being riveted over to secure the stem rigidly to the shell. Stem 83 projects through plate opening 29 and has lever 42 attached thereto. As shown in FIGURE 16 lever 42 is usually a hard steel element having a generally circular opening lined with teeth or serrations at 84. In order to secure lever 42 non-rotatably to the valve stem the upper reduced end 86 of the brass stem is cylindrical and of such diameter that when serrated opening is pressed down over it the harder serration cuts grooves in the softer brass to form a tight non-rotatable connection. Then usually the top of the stem is staked over by the chisel cuts indicated at 87.

The plug structure at 71 may be preferable to that shown in FIGURE 2 because less brass is needed for the stem, thus reducing expense, and it is possible to further reduce expense by Teflon coating the assembled shell and stem of the plug 71. It has been found that the separately Teflon coated shell 36 and stem 37 units of plug 35 may not fit tightly because the shell metal will anneal at the range of coating temperatures and thus not be adaptable to press fits. This problem is avoided in the plug structure of FIGURE 3 wherein the stem 83 and shell 74 are riveted together and will not become loose when Teflon coated.

In the foregoing examples of the invention two outlet tubes are shown attached to a body having one inlet tube. The illustrated saddle structure may be used in other forms of the invention, as where tube 63 might be an inlet tube, with the lower end of the valve body closed at extension 34 in FIGURE 2 or at ledge 73 in FIGURE 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. In a valve, a hollow body having an opening, a saddle member comprising an outer annular portion secured to said body around said opening, an inner annular portion projecting through said opening within the body, means providing an axially outwardly facing annular shoulder on said inner portion, and a fluid conducting tube inserted within said inner portion to abut at its inner end on said shoulder.

2. In the valve defined in claim 1, said inner portion of the saddle member terminating in a converging tapered section providing a mounting for a sealing annulus within the body.

3. In the valve defined in claim 2, said shoulder being formed within said inner portion at the axially outer end of said tapered section.

4. In the valve defined in claim 1, said saddle member comprising an integral element wherein the outer portion surrounds the inner portion in radially spaced relation and the outer ends of said portions are joined by a bridge.

5. A valve assembly comprising a body having fluid inlet and outlet openings and containing a member that is rotatable between positions where it blocks or permits fluid passage between said openings, means at the outlet opening for mounting an outlet tube in predetermined alignment with said outlet opening comprising an annular member peripherally secured around said outlet opening and having an axially outwardly facing internal shoulder against which abuts the inner end of said outlet tube, and a resilient seal annulus mounted on said member axially inwardly of said tube formed to engage and resiliently conform to the adjacent surface of said rotatable member.

6. In the valve assembly defined in claim 5, said annular member comprising radially spaced inner and outer annular portions integrally joined at their outer ends by a bridge, the radially outer portion being secured to said body around said outlet opening and said internal shoulder being formed on the radially inner portion.

7. In the valve assembly defined in claim 6, said inner portion being formed axially inwardly of said shoulder with a reducing cross section portion on which said seal annulus is mounted.

8. In the valve assembly defined in claim 6, said outer portion having a radial flange secured to the body around said opening.

9. In the valve assembly defined in claim 5, said inner and outer portions having generally cylindrical concentric portions, and said inner portion terminating within the valve body in a frusto-conical portion on which said seal annulus is mounted.

10. In the valve assembly defined in claim 5, said annular member being an integral metal stamping.

11. In the valve assembly defined in claim 5, said valve body and annular member being integral sheet metal elements permanently bonded together.

12. In the valve assembly defined in claim 5, said rotatable member being a plug, said body being a hollow cylinder in a side wall of which said outlet opening is formed, and the lower end of said body has an inturned hollow boss in which an inlet tube is secured, said plug being hollow with an open lower end surrounding said boss and a side opening adapted to align with said body outlet opening when the valve is in open condition.

13. In the valve assembly defined in claim 12, said plug having an integral top wall to which is secured a stem projecting through the upper end of said body, and a resilient stem seal annulus mounted in the upper end of said body above said top wall.

14. In the valve assembly defined in claim 12, said boss having an inturned ledge to limit inward positioning of said inlet tube.

15. A valve assembly comprising: a body having fluid inlet and outlet openings and containing a plug member that is rotatable between positions where it blocks or permits fluid passage between said openings, outlet means at the outlet opening providing an outlet tube in predetermined alignment with said outlet opening; said outlet means comprising an annular member, means peripherally securing said annular member around said outlet opening, and a resilient seal annulus mounted on said annular member internally of said body formed to engage and resiliently conform to the adjacent surface of said rotatable plug member; said body being a hollow cylinder in a side wall of which said outlet opening is formed, and the lower end of said body having an inturned hollow boss in which an inlet tube is secured; and said plug member being hollow with an open lower end surrounding said boss and a side opening adapted to align with said body outlet opening when the valve is in open condition.

References Cited

UNITED STATES PATENTS

| | | | |
|---|---|---|---|
| 2,406,502 | 8/1946 | Lines | 251—367 X |
| 2,925,992 | 2/1960 | Rickard | 251—172 |
| 2,973,181 | 2/1961 | Johnson | 251—172 |
| 3,049,171 | 8/1962 | Neuerburg | 137—38 X |
| 3,058,718 | 10/1962 | Johnson | 251—310 X |

CLARENCE R. GORDON, Primary Examiner

U.S. Cl. X.R.

251—172, 214, 367